United States Patent
Primm et al.

(10) Patent No.: US 8,837,954 B2
(45) Date of Patent: Sep. 16, 2014

(54) ASSET TRACKING SYSTEM FOR RACK-BASED ENCLOSURES

(75) Inventors: Michael R. Primm, Austin, TX (US); Ronald B. Graczyk, Cedar Park, TX (US); Ryan D. Joy, Austin, TX (US); Matthew C. Blackledge, Austin, TX (US)

(73) Assignee: RF Code, Inc., Austin, TX (US)

( * ) Notice: Subject to any disclaimer, the term of this patent is extended or adjusted under 35 U.S.C. 154(b) by 486 days.

(21) Appl. No.: 13/115,491

(22) Filed: May 25, 2011

(65) Prior Publication Data

US 2011/0318013 A1 Dec. 29, 2011

Related U.S. Application Data

(60) Provisional application No. 61/348,111, filed on May 25, 2010.

(51) Int. Cl.
*H04B 10/114* (2013.01)
*H04B 7/00* (2006.01)
*G06K 7/00* (2006.01)
*G06K 7/10* (2006.01)
*G06K 19/07* (2006.01)

(52) U.S. Cl.
CPC .......... *G06K 19/0728* (2013.01); *G06K 7/1097* (2013.01)
USPC ......... 398/156; 398/127; 398/201; 340/10.52

(58) Field of Classification Search
USPC ................. 398/156, 201; 340/10.52
See application file for complete search history.

(56) References Cited

U.S. PATENT DOCUMENTS

| | | | |
|---|---|---|---|
| 5,134,277 A | 7/1992 | Yerbury et al. | |
| 5,874,724 A | 2/1999 | Cato | |
| 6,606,174 B1 * | 8/2003 | Ishikawa et al. | 398/135 |
| 7,889,993 B2 * | 2/2011 | Wang et al. | 398/138 |
| 2004/0012496 A1 | 1/2004 | De Souza et al. | |
| 2004/0100834 A1 | 5/2004 | Waters | |
| 2004/0146292 A1 | 7/2004 | Kawakami | |
| 2004/0193316 A1 | 9/2004 | Lunak et al. | |
| 2005/0152261 A1 | 7/2005 | Kahlman | |
| 2006/0124743 A1 | 6/2006 | Venema et al. | |
| 2006/0131403 A1 | 6/2006 | Cato | |
| 2007/0050080 A1 | 3/2007 | Peck | |
| 2008/0310850 A1 * | 12/2008 | Pederson et al. | 398/135 |
| 2009/0129097 A1 | 5/2009 | Ewert et al. | |
| 2009/0198371 A1 * | 8/2009 | Emanuel et al. | 700/226 |
| 2011/0210167 A1 * | 9/2011 | Lyon | 235/375 |

OTHER PUBLICATIONS

PCT/ISA/210 International Search Report dated Oct. 31, 2011 for corresponding PCT Application No. US2011/037896.
European Search Report for corresponding EP Application No. EP 11787319.0, Apr. 28, 2014.

* cited by examiner

*Primary Examiner* — Nathan Curs
(74) *Attorney, Agent, or Firm* — Larson Newman, LLP

(57) ABSTRACT

A system includes a beacon device including a communication strip having a plurality of directed light emitters distributed along the communication strip. The beacon device can transmit a directed light signal via the directed light emitters. The system further includes a tag including a processor, a radio frequency transmitter coupled to the processor, a directed light receiver coupled to the processor, and a lens having first and second major surfaces and a side surface, the tag to receive the directed light signal via the side surface and to transmit a radio frequency tag message via the radio frequency transmitter. The system also includes a radio frequency reader to receive the radio frequency tag message.

20 Claims, 4 Drawing Sheets

ASSET TRACKING SYSTEM FOR RACK-BASED ENCLOSURES

CROSS-REFERENCE TO RELATED APPLICATION(S)

The present application is a non-provisional of U.S. Provisional Patent Application No. 61/348,111, entitled "ASSET TRACKING SYSTEM FOR RACK-BASED ENCLOSURES" filed on May 25, 2011, the entirety of which is herein incorporated by reference.

FIELD OF THE DISCLOSURE

This disclosure, in general, relates to asset tracking systems and in particular, to asset tracking systems for use in tracking rack-based assets.

BACKGROUND

With the increasing complexity of commercial organizations, industry is seeking to track the location and use of inventory and equipment with increasing specificity and detail. Accordingly, various industries are turning to asset tracking systems that include electronically readable identification tags.

In particular, the information technology industry has particular interest in tracking information technology assets in data centers, particularly those stored in equipment racks. Conventionally, such assets have been bar coded and manually scanned, requiring frequent and expensive manual data collection in order to maintain inventory and locate moved assets.

More recently, passive radio frequency identification techniques have been used, placing passive radio frequency identification (RFID) tags on the front of assets and either installing permanent RFID readers in the racks or manually visiting each rack with the scanner and opening and sweeping the scanner over the rack to find assets. However, installation of permanent readers has proven unreliable and expensive because cables and other minor obstructions interfere with the ability to read such tags. In addition, manual scanning using handheld RFID readers has ultimately proven of little value versus traditional bar code methods since it still requires a human visit to each location.

As such, an improved system and method for tracking assets, particularly information technology assets located in rack-based systems would be desirable.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

In an exemplary embodiment, a tracking system includes a beacon device, a plurality of identification tags, and a reader. In an example, the beacon device includes a processor in communication with a communication strip. The communication strip includes a plurality of emitters to emit directed light signals, such as infrared or visible light signals. In an example, the communication strip can extend along a horizontal or vertical edge of a rack-based system. The identification tags include a processor in communication with a receiver responsive to directed light signals and a lens to direct light signals received from a side surface of the lens to the receiver. In addition, the identification tags can include a transmitter to transmit a tag message to the reader, such as via a radio frequency, acoustic or directed light signal. For example, the reader can be a radio frequency reader and the identification tags can include a radio frequency transmitter to transmit tag messages to the radio frequency reader.

In further embodiment, a method for tracking an asset can include transmitting a directed light signal from a communication strip of a beacon device, receiving the directed light signal via a side surface of a lens of an identification tag, and transmitting a tag message from the identification tag to a reader. The directed light signal is indicative of location. The tag message includes an indication of the location received via the directed light signal.

Figure 1:
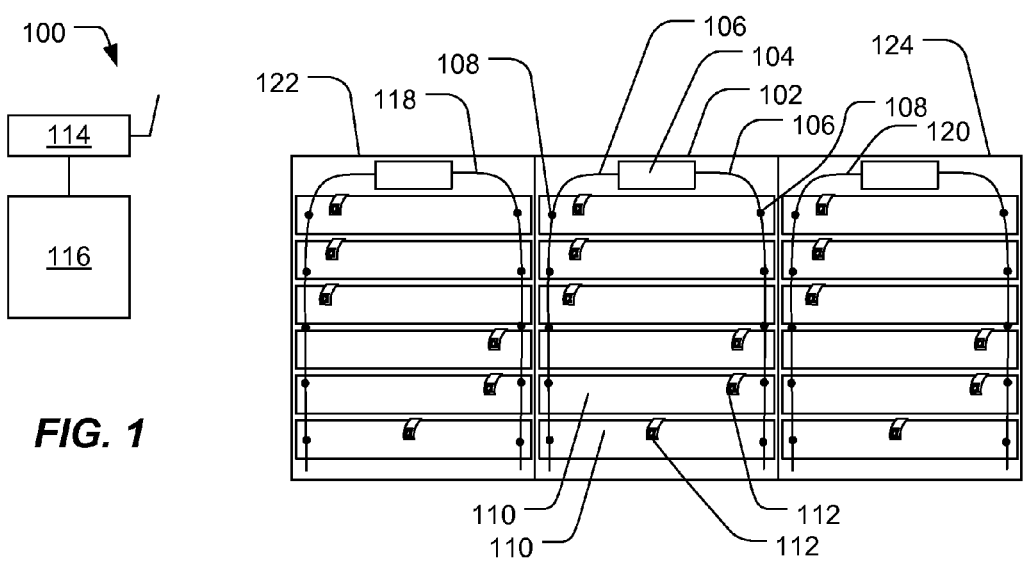
FIG. 1 includes an illustration of an exemplary asset tracking system.

As illustrated in FIG. 1, an exemplary tracking system can be disposed in a set of cabinets or racks 102 in which a set of assets 110 are located, herein referred to as rack-based systems. For example, the assets 110 can be information technology assets such as servers, routers, power supplies, rack sensors sensing, for example, temperature, humidity, air flow, or network traffic, other rack-based equipment, or any combination thereof. As illustrated, each rack 102 can include one or more assets 110. Identification tags 112 can be disposed on the assets 110. The identification tags 112 can be responsive to directed light signals received from a beacon device 104 disposed within the rack 102 and can transmit tag messages to a reader 114 either disposed within the rack 102 or as illustrated, disposed outside of the rack 102. Directed light signals are signals transmitted in the infrared or visible light spectrums regardless of angle of incidence.

In an example, each of the beacon devices 104 can include a mounted device from which communication strips 106 extend such as along a horizontal or vertical edge of the rack 102. For example, the communication strip 106 can extend along a vertical front edge of the track 102. Each communication strip 106 includes a plurality of directed light emitters 108 distributed along the communication strip 106. In the illustrated example, each beacon device 104 includes at least two communication strips 106 that include a plurality of directed light emitters 108 distributed along the length of the communication strips 106. The beacon device 104 can facilitate transmission of directed light signals from the plurality of directed light emitters 108 to be received by the identification tags 112. The directed light signal can be a signal in infrared or visible light spectrums and can include an indication of location, such as the rack location or the identification of the rack 102. In another example, the directed light signal can include an identifier associated with the beacon device 104.

The identification tag 112 includes a processor coupled to a receiver responsive to directed light signals, such as those emitted by the directed light emitters 108. In an example, the identification tag 112 also includes a lens to direct the directed light signal to the receiver. The identification tag 112 can also include a transmitter to transmit a tag message to a reader 114. In an example, the tag message includes an identification of the tag and an indication of location received via the directed light signal from the reader 104. In a particular example, the identification tag 112 can transmit via a radio frequency signal to the reader 114.

As illustrated, the reader 114 is located outside of the racks 102. Alternatively, the reader 114 can be located within a rack 102 or can have antennas extending into each of the racks 102. For example, an antenna (not illustrated) can extend into a rack 102 and can extend along a vertical or horizontal surface within the rack. The reader 114 can be coupled to a computational device 116 and can provide information associated with the tag messages received from the identification tags 112 to the computation device 116. For example, the computational device 116 can be a server, computer, or database system for storing and manipulating tag messages and processing information associated with the tag messages. The reader 114 can be connected directly to the computation device 116 or can be connected via a network, such as a local area network, a wide area network, or a global network.

In a particular example, the beacon device 104 includes two communication strips 106 that extend along a vertical front edge of a rack or cabinet 102. The identification tags 112 are disposed to lie between the communication strips 106 and extend from a front face of the assets 110. As such, the identification tags 112 are more likely to receive directed light signals from the communication strips 106 located in rack 102, than communication strips (e.g., 118 and 120) located within adjacent racks (e.g., 122 and 124). Extraneous signals are signals transmitted from devices, such as communication strips located in other racks, other than the communication strips 106 associated with the rack in which the identification tags 112 are disposed. Noise includes directed light, such as infrared or visible light, that does not include data to be interpreted by a receiver of the identification tags 112. To further limit processing of extraneous signals, directed light signals can be transmitted through the communication strips 106 using protocols that rely on a two-communication strip configuration. For example, a directed light signal can be transmitted from a first communication strip at a first time and from a second communication strip at a second time. The identification tags 112 can be configured to process the directed light signal after receiving two of the same signals at different times, the second signal confirming the first signal. In another example, a first communication strip can transmit a first portion of a directed light signal and a second communication strip can transmit a second portion of the directed light signal. As such, identification tags not located between the first and second communication strips are less likely to receive both parts of the directed light signal. In a further example, first and second communication strips 106 can transmit the same directed light signal simultaneously. For example, the transmitted directed light signal from any one communication strip can have a strength less than or equal to ambient noise, but the sum of the strengths of the directed light signals can be greater than ambient noise. As such, an identification tag 112 located between the communication strips 106 is more likely to interpret the directed light signal as a signal and not noise, whereas the directed light signal can appear as noise to identification tags not located between the communication strips 106.

Figure 2:
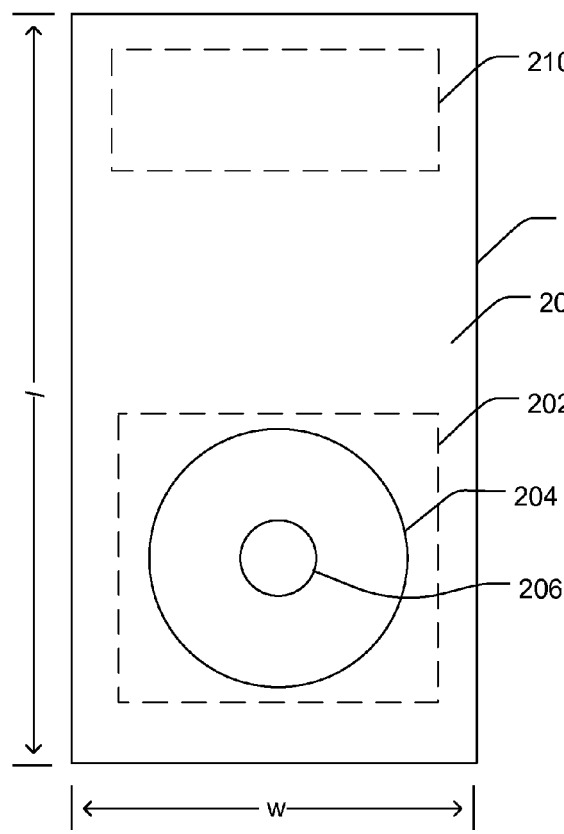
FIG. 2 and FIG. 3 include illustrations of exemplary identification tags.

As illustrated in FIG. 1, each of the assets 110 can be tracked using an attached identification tag 112. FIG. 2 includes an illustration of an exemplary identification tag 200 that can be attached to a rack-based asset for tracking the location of such an asset or other information associated with the asset. In the illustrated embodiment of FIG. 2, the tag or identification tag 200 includes tag circuitry 202 and a lens 204 coupled to a flexible substrate 208. In an example, flexible substrate 208 has a width and a length, the length being longer than the width. In an example, the flexible substrate 208 has an aspect ratio defined as the ratio of the length over the width of at least 1.5, such as in a range of 1.5 to 10, a range of 2 to 8, or a range of 2 to 5.

In a further example, the flexible substrate 208 can be formed of a polymeric material, such as a thermoplastic polymer. For example, the thermoplastic polymer can include a polyolefin, a fluoropolymer, a polyamide, a polyester, a polycarbonate, a thermoplastic polyimide, or any combination thereof. The polymeric material can include additives, such as pigments, stabilizers, flame retardant, or any combination thereof. In particular, the polymeric material has a flexural modulus of at least 0.5 GPa, such as at least 0.75 GPa, at least 0.9 GPa, or even at least 1.0 GPa. In general, the flexural modulus is not greater than 5 GPa.

While the identification tag 200 is illustrated as having a rectangular substrate, the identification tag 200 can alternatively have a circular shaped substrate, a T-shaped substrate, a polygonal shaped substrate, or any combination thereof. In a particular example, the identification tag can include a T-shaped substrate in which the cross bar to the T-shape is attached to an asset to be tracked.

The identification tag 200 can be attached to an asset using a fixation mechanism, such as Velcro or adhesive. In the illustrated embodiment, the identification tag 200 includes a portion 210 of the flexible substrate 208 covered in adhesive. For example, a portion 210 of a backside surface of the flexible substrate 208 can be covered with an adhesive to attach the identification tag 200 to an asset to be tracked.

The identification tag 200 includes a lens 204 positioned to at least partially overlie a portion of a tag circuitry 202. In a particular example, the lens 204 includes a feature 206 configured to reflect directed light signals received from a side surface of the lens 204 towards a receiver of the tag circuitry 202. In addition, the feature 206 can attenuate directed light noise (noise in the infrared or visible spectrum) or extraneous directed light signals received from a major surface so that the noise or extraneous direct light signals are less likely to be received at the receiver of the tag circuitry 202.

Figure 3:
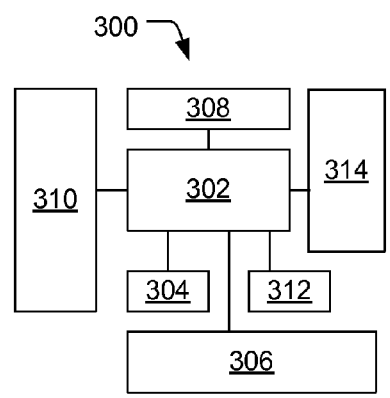

As illustrated in FIG. 3, a tag circuitry 300 can include a processor 302. The processor 302 can be in communication with a receiver 304 responsive to directed light signals. In an example, a directed light signal includes an infrared signal or a visible light signal. In particular, the receiver 304 can be responsive to infrared signals. The processor 302 can be coupled to a transmitter 306 for transmitting tag messages. The processor 302 can also be coupled to a power supply 310, memory 308, a light or acoustic emitter 312, sensor 314, or any combination thereof.

The processor 302 or other components can be coupled to a power source 310. For example, the receive 304, the transmitter 306, the sensors 314, the memory 308, or the emitter 312 can be coupled directly or indirectly to a power source 310. In addition, a memory 308 can be in communication with the processor 302. For example, instructions operable by the processor to implement methods described herein can be stored within the memory 308.

In addition, the tag circuitry 300 can include an emitter 312 such as an acoustic emitter or one or more lights, such as light emitting diodes. For example, the emitter 312 can include one or more light emitting diodes (LED) responsive to the processor 302 to indicate, for example, activation of the tag circuitry 300 or the receipt of a signal via the receiver 304. In another example, the emitter 312 can be an acoustic emitter, for example, to emit acoustic signals in response to signals received via the receiver 304.

In a further example, the tag circuitry 300 can include one or more sensors 314. For example, the sensor 314 can include a temperature sensor, a humidity sensor, a pressure sensor, an acoustic sensor, or any combination thereof. In an example, the tag circuitry 300 can include a temperature sensor to detect temperature at a rack. In another example, the tag circuitry 300 can include an acoustic sensor to detect audible alarms of rack-based equipment. In a further example, the sensor 314 can be a capacitively driven communication circuitry accessible by external sensors or equipment. Such external sensors can be sensors forming part of rack-based assets or can include other sensors such as door sensors, power sensors, humidity sensors, liquid sensors, temperature sensors, pressure sensors, air flow sensors, or any combination thereof.

The receiver 304 is responsive to directed light signals and can include a variable gain filter. For example, the variable gain filter can be configured to filter noise, such as ambient directed light noise or extraneous directed light signals. In particular, the receiver 304 can include internal circuitry to adjust the variable gain filter to filter such noise and extraneous signals or can be adjusted by the processor 302 to filter such ambient noise or extraneous directed light signals.

In an example, the processor 302 can process signals received via the receiver 304 and can formulate a tag message to be transmitted by the transmitter 306. In an example, the transmitter 306 is a radio frequency transmitter. The tag message to be transmitted via the transmitter 306 can include information, such as a tag identification, a group identification, payload data, such as sensor data, or a location code. In an example, the receiver 304 receives a directed light signal indicating a location, such as, for example, including a location code. The processor 302 can formulate a tag message indicative of the location associated with the directed light signal received by the receiver 304.

In a further example, a directed light signal received by the receiver 304 can also include instructions and the processor 302 can respond as directed by the instructions. For example, instructions received in the directed light signal at the receiver 304 can instruct the processor 302 to emit a visible light signal through an emitter 312. In another example, such an instruction can instruct the processor to emit a sonic signal through a sonic emitter. In a further example, the instructions can instruct the processor 302 to send a tag message. In such a manner, an individual in search of a tag can receive a visual or acoustic indication of which tag is being sought and as such, can more easily identify the asset of interest.

Figure 4:
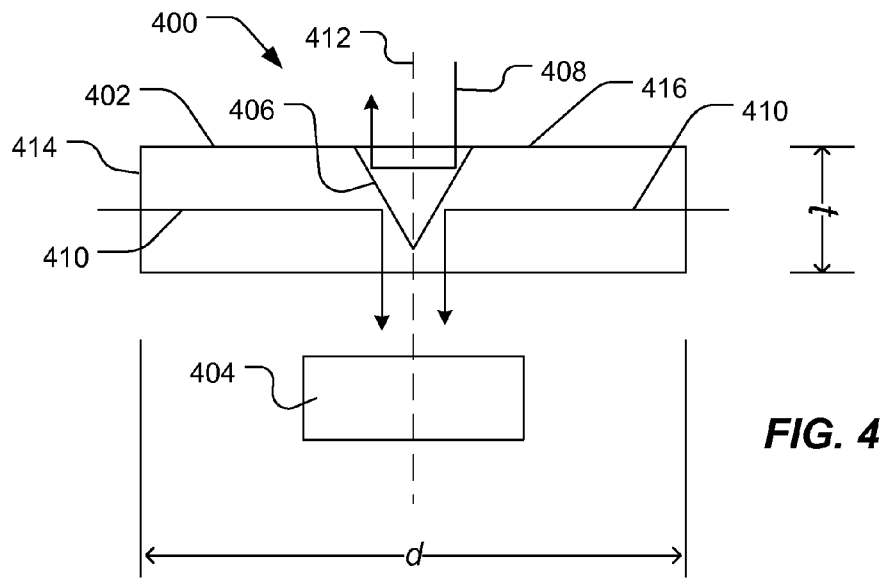
FIG. 4, FIG. 5, FIG. 6, and FIG. 7 include illustrations of exemplary lenses.

In a particular example, a lens is disposed at least partially over the tag circuitry so as to direct directed light signals to the receiver. FIG. 4 includes an illustration of an exemplary lens system 400 positioned to direct directed light signals to a receiver 404. The lens includes a major surface 416 and a side surface 414. For example, the lens 402 can have a disc shape, with a circular or polygonal major surface. In an example, the lens 402 is positioned relative to the receiver 404 so that internal surfaces 406 formed within the lens 402 direct at least a portion of signals 410 received by a side surface 414 towards the receiver 404. In particular, the internal surfaces 406 form an angle relative to the side surface 414 that is greater than a critical angle, the smallest angle of incidence for which light is totally reflected. Optionally, the internal reflective surfaces 406 can also attenuate signals 408 received via a major surface 416, reflecting at least a portion of such signals 408 away from the receiver 404. In such a manner, signals received via side surface 414 are enhanced and at least partially reflected toward the receiver 404, whereas signals received by a major surface 416 are attenuated and at least partially reflected away from the receiver 404. In the example illustrated in FIG. 4, the lens system 400 has a central axis 412 aligned with the receiver 404. The features forming the internal reflective surfaces 406 are conical in shape and aligned with the central axis 412.

The lens 402 can be formed of a transparent material. For example, the lens can be formed of a transparent ceramic material or a transparent polymeric material. In an example, the ceramic material includes silica glass, silica borate glass, sapphire, or a combination thereof. An exemplary polymeric material can include a polyolefin, for example polyethylene or polypropylene, a polycarbonate, poly vinyl chloride, acrylic polymer, polystyrene, styrene-acrylonitrile copolymer, methylmethacrylate-styrene copolymer, or any combination thereof. The reflective surface can be formed by a changed in refractive index, such as a through a change in material. For example, the reflective surface may be in interface between the transparent material and air. In another example, the reflective surface may be formed of a reflective material, such a deposited metal layer.

The lens 402 attenuates extraneous signals and ambient noise received via a major surface, referred to herein as major surface attenuation, by at least 10%, such as at least 30%, or even at least 50%. In another example, the lens 402 facilitates transmission of signals received via a side surface 414, improving intensity of the signal relative to a lens absent internal reflective surfaces, referred to herein as side surface transmission, by at least 10%, such as at least 30%, or even at least 50%.

In an example, the lens 402 has a thickness "t" and a diameter "d". The diameter can be the characteristic diameter expressed as the square root of four times the cross-sectional area (A) of the major surface of the lens 402 divided by Pi, i.e., sqrt(4*A/Pi). In an example, the lens has a thickness of at least 1 mm, such as a thickness in a range of 3 mm to 3 cm, a range of 5 mm to 2.5 cm, or a range of 1 cm to 2.5 cm. The lens can have a diameter in a range of 5 mm to 10 cm, such as a range of 1 cm to 8 cm, or a range of 1 cm to 5 cm. A ratio of the diameter to the thickness can be in a range of 0.5 to 10, such as a range of 1 to 5.

Figure 5:
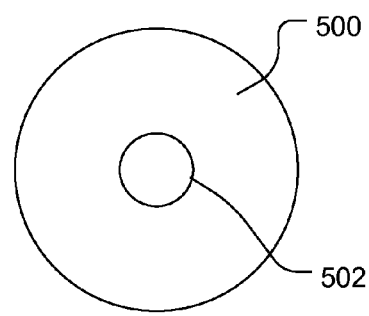
Figure 6:
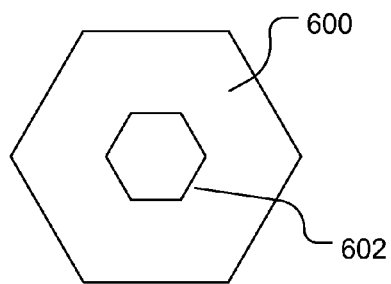
Figure 7:
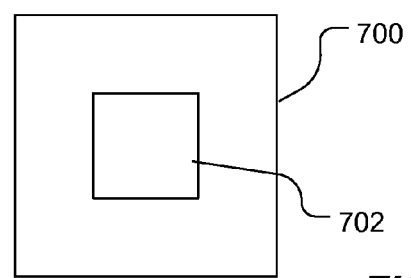

The lens can have a circular shape or polygonal shape when viewed from its major surface. For example, FIG. 5 includes an illustration of a circular lens 500 having the shape of a circle or oval. As illustrated, the lens 500 includes a feature 502 forming internal reflective surfaces within the lens 500. For example, the feature 502 can be a conical feature, such as a conical opening or recess extending inwardly from a major surface of the lens 500. In another example, the lens can be polygonal. For example, as illustrated in FIG. 6, the lens can have more than four sides, such as at least six sides. The lens 600 can further include internal reflective features 602, such as a seven-sided pyramid extending into the lens from an external surface. In a further example, the lens can be a square or rectangular lens 700 including a surface feature 702, such as a pyramid extending into the lens from the outside major surface. When in place on the identification tag, the features can overlie the receiver and both reflect signals received via a side surface to the receiver and attenuate noise received via the major surface.

While the receiver and other tag circuitry is illustrated in FIG. 2 and FIG. 4 as being separate from the lens, in an alternative embodiment, the lens can encompass the circuitry and can form a major portion of the structure of the identification tag. For example, the receiver can be imbedded within the lens. In another example, the lens can be formed to encompass other circuitry on the identification tag. For example, the identification tag may not include a flexible strip and may instead include a lens that encompasses the tag circuitry and that has an adhesive backing to secure the lens and tag circuitry to an asset to be tracked.

Figure 8:
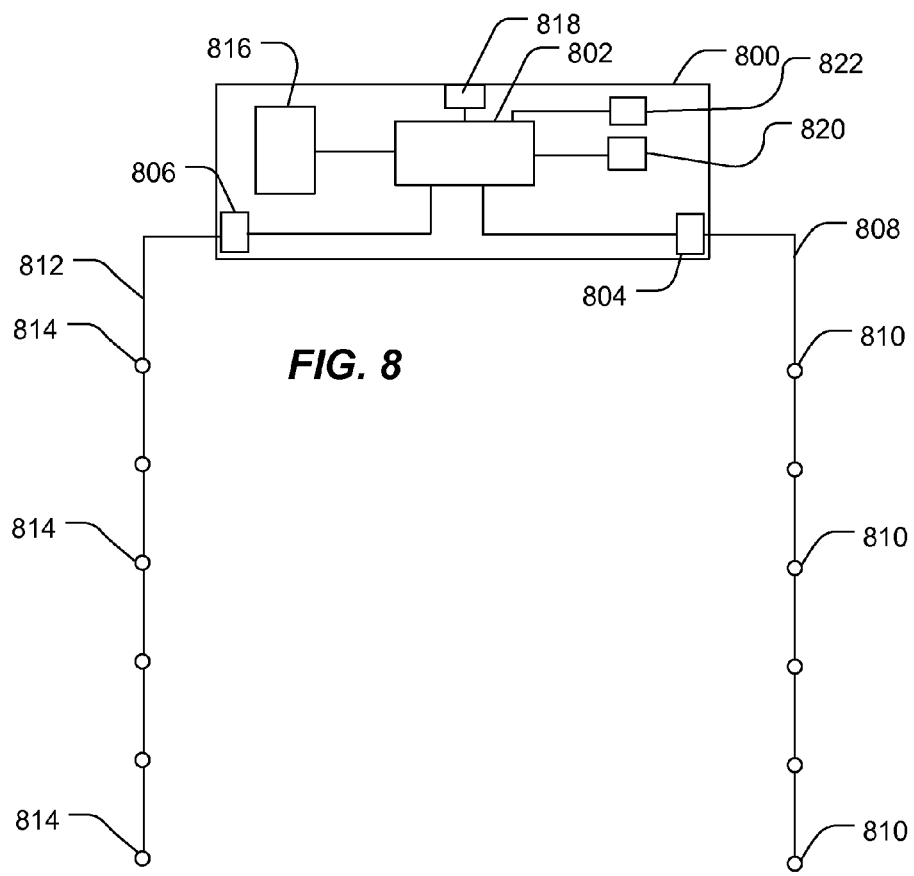
FIG. 8 includes an illustration of an exemplary beacon device.

In a further example illustrated in FIG. 8, an asset tracking system includes a beacon device 800. In an example, the beacon device 800 includes a processor 802 in communication with a communication strip, such as communication strips 808 and 812. The beacon device 800 can also include an external communication port 818, a power supply 816, and sensors 820. The processor 802 can facilitate communication of a directed light signal via the one or more communication strips 808 or 812. The communication strips 808 or 812 can include a plurality of directed light emitters 810 or 814 distributed along the length of the communication strips 808 or 812. For example, the directed light emitters 810 or 814 can include light emitting diodes, such as infrared light emitting diodes. In another example, the directed light emitters 810 or 814 can include terminal ends of optical fibers or slits on optical fibers, or other reflective mechanisms within optical fibers. In an example, the communication strip 808 or 812 can be a wire or multiple wires extending to light emitting diode (LED) emitters. The beacon device 800 can include current sensors to determine power consumption of each LED. The current sensor can indicate when an LED or bulb is out, how bright the directed light transmission is, or other conditions associated with the LED or bulb emitter. In another example, directed light, such as infrared directed light, can be transmitted from a source 804 or 806 through an optical fiber or a 4-channel fiber optic cable forming the communication strip 808 or 812. The optical fiber or fibers can be scored periodically along their length to effect directed light emitters 810 or 814. In an example, the communication strip (808 or 812) includes at least 3 emitters, such as at least 4 emitters, at least 6 emitters or even at least 10 emitters.

In a particular example, the communication strip (808 or 812) is in the form of an elongated member having a diameter or width and a length, the length being longer than the diameter or width. In an example, the communication strip (808 or 812) has a strip aspect ratio defined as the ratio of the length to the width or diameter, of at least 10, such as at least 20 or even at least 30. As such, a narrow communication strip having the directed light emitters 810 or 814 distributed along the length of the communication strip 808 or 812 can be disposed along an edge of a rack system, such as a horizontal edge or a vertical edge of the rack system.

The beacon device 800 can be attached on the inside of a rack. For example, the beacon device 800 can be attached to the underside of a top of the rack. In another example, the beacon device 800 can be configured to fit in a space of the rack. In a particular example, an adhesive tape can be used to secure the beacon device 800 to the underside of the top of the rack.

The beacon device 800 can include an external communication port 818 coupled to the processor 802. In an example, the external communication port 818 can be a wired communication port or a wireless communication port. In an example, a wireless communication port can communicate using protocols such as IEEE 802.11x, IEEE 802.11.15, IEEE 802.11.16, IEEE 802.15.3, Bluetooth® communication circuitry, ZigBee communication circuitry, or any combination thereof. A wired communication circuitry can include circuitry to communicate via Ethernet, parallel port, a serial port, a USB port, or any combination thereof.

In an example, the beacon device 800 can be provided with an identifier. For example, the identifier can be associated with the identity of the beacon device 800, can be associated with a location of the beacon device 800, or a combination thereof. The processor 802 can direct communication strips 808 or 812 to communicate a directed light signal indicative of the identifier of the beacon device 800. In such a manner, identification tags can receive the signal indicative of the identity of the beacon device 800 and can transmit a tagged message to a reader to indicate the location of the tag and its associated asset.

In a further example, the processor 802 can facilitate transmission of a directed light signal that includes instructions to which the processor of the tag is responsive. For example, the beacon device 800 can receive instructions from an external device via the communication port 818 to instruct a particular tag to provide a visual or acoustic signal indicating its location. The processor 802 can facilitate transmission of a directed light signal via the emitters 810 or 814 that includes instructions to which a particular identification tag is responsive. For example, the instructions can include the identity of an identification tag and instructions to the identification tag to emit an acoustic signal or activate a light emitting diode (LED).

The beacon device 800 can include a power supply 816 coupled to the processor 802 and can supply power to the processor 802 and other equipment either directly or indirectly. The power supply 816 can include a stand-alone power supply, such as a battery. In another example, the power supply 816 can derive power from line power. In a further example, the power supply 816 can be derived from a USB source. Further, the beacon device 800 can include a memory 822 coupled to the processor 802. For example, the memory 822 can store instructions operable by the processor to perform methods described here or can store data, such as sensor data, parameters or identifiers. Further, the beacon device 800 can include one or more sensors 820 coupled to the processor 802. For example, the sensors 820 can include temperature sensors, air flow sensors, humidity sensors, ambient light sensors, door sensors, motion sensors, current sensors or any combination thereof. The beacon device 800 can be responsive to the data from the sensors or can include data from the sensors in beacon signals.

For example, the beacon device 800 can include a door sensor 820. When the door is opened, the beacon device 800 can instruct identification tags in proximity to the communication strips to power up in the case of tags having such a feature. Further, the beacon device 800 can power up in response to a door opening and listen for a communication signal from a handheld device or via a network. In such a case, an individual approaching a rack in search of an asset within the rack can instruct the beacon device 800 to transmit a signal to identification tags to emit an acoustic or light signal to indicate which identification tag is associated with the desired asset. When the door is closed, the beacon device 800 can power down to conserve power or can instruct identification tags to either power down or to anticipate a period of time in which a beacon message indicative of location is not to be received. In particular, the deacon device 800 can enter a low duty cycle mode or instruct the identification tags to enter a low duty cycle mode, transmitting less frequently. In contrast to prior systems, such a system can conserve power both in the tags and at the beacon device allowing the beacon device to run on battery power.

In a further example, the processor 802 can facilitate transmission of signals indicative of ambient noise via emitters 810 or 814 to influence variable gain filters associated with the receivers on identification tags. In such a manner, the beacon device 800 can influence the receiving characteristics of an identification tag to more effectively prevent extraneous directed light signals from being interpreted or processed by the identification tag. In a particular example, the beacon device 800 can include a sensor 820, such as an ambient noise sensor, in communication with the processor 802. The processor 802 can adjust artificial noise emitted by the directed light emitters 810 and 814 in response to a measurement or characteristic of the ambient noise detected by the sensor 820, such as amplitude, frequency, or modulation of the ambient noise.

In an additional exemplary embodiment, the processor 802 can direct transmission of signals via the communication strips 808 and 812 independently. For example, the processor can direct transmission of a first signal via a communication strip 808 and can direct transmission of a second signal via a communication strip 812. For example, the processor 802 can facilitate transmission of a signal first via the communication strip 808 and subsequently transmit the same signal by the communication strip 812. In such a manner, an identification tag configured to receive two signals and compare them before acting can receive a first signal from a first communication strip and a second signal from a second communication strip and act only in response to two identical signals being received. In such a case, extraneous signals received from an adjacent rack can be more effectively filtered. In another example, the processor 802 can facilitate transmission of noise, such as artificial noise via a communication strip 808 and transmission of a directed light signal via the communication strip 812. In an additional example, the processor 802 can direct a first portion of a directed light signal be transmitted by a communication strip 808 and a second portion of the directed light signal transmitted by a communication strip 812. In such a case, a tag located between two communication strips can receive a first portion of the signal from the first communication strip and a second portion of the directed light signal from a second communication strip, whereas tags located elsewhere are less likely to receive both portions of the directed light signal and thus, are less likely to act upon an extraneous portion of a directed light signal.

Figure 9:
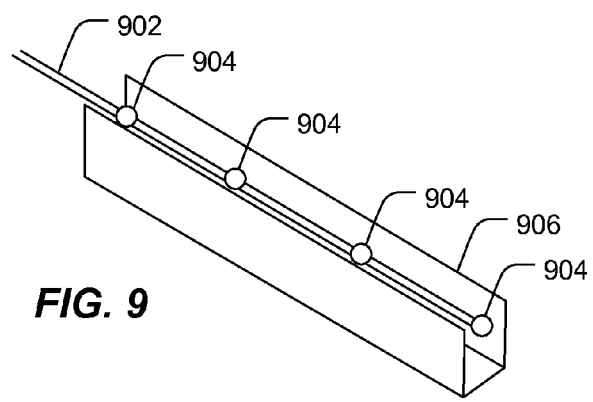
FIG. 9 includes an illustration of an exemplary communication strip.

The communication strips 808 and 812, for example, extend along an edge of a rack. The communication strips 808 and 812 can be mechanically secured to the rack, for example, using clips, screws, or rivets. In another example, the communication strips can be adhered to the edge of the rack using an adhesive or Velcro system. For example, pressure sensitive adhesive strips can be adhered to a back of a communication strip and secure the communication strip to an edge of a rack. In a further example illustrated in FIG. 9, a communication strip 902 can be disposed within a channel 906. The channel 906 can be secured to the edge of the rack using mechanical fasteners or by adhesives. The communication strip 902 can be secured within the channel 906 such that directed light emitters 904 are positioned to directed light out of the channel. Such a channel 906 can facilitate transmission of directed light signals in a desired direction while limiting transmission in undesired directions, forming well-defined shadows and narrow regions of illumination by the directed light signal.

Figure 10:
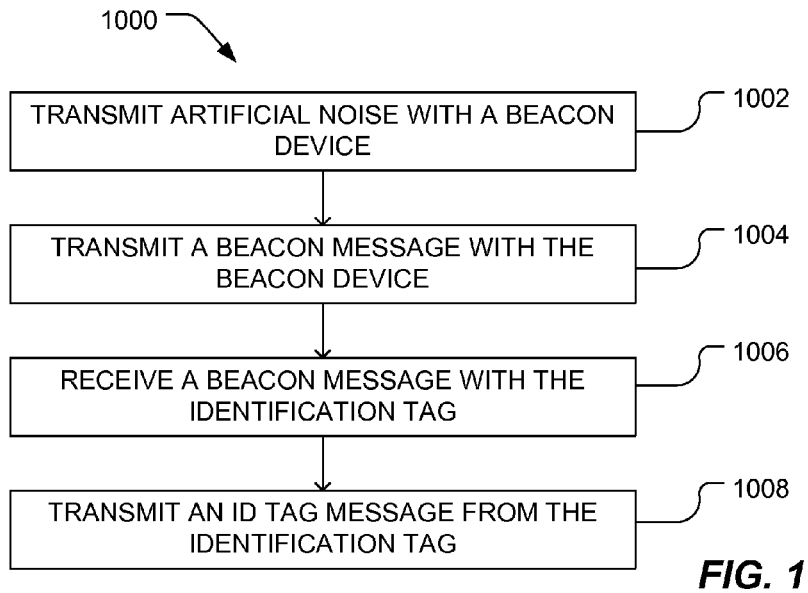
FIG. 10, FIG. 11, and FIG. 12 include flow diagrams of exemplary methods for tracking assets.

Utilizing embodiments of the system above, assets can be more accurately located or more easily found. For example, as illustrated in FIG. 10, a method 1000 for tracking an asset can include transmitting an artificial noise from one or more communication strips of a beacon device, as illustrated at 1002. For example, the beacon device can transmit an artificial ambient noise characteristic of noise expected to be in the ambient environment to manipulate the variable gain filters of a tag identification device to limit the number or extraneous signals incorrectly interpreted as instructions by the tag identification device.

In addition, the beacon device can transmit a beacon message, as illustrated at 1004. For example, the beacon message can include an identifier, such as a location of the beacon device. In addition, the beacon message can include commands to which an identification tag is responsive. Such commands can include the identification of a specific tag from which a response is desired or can include a general instruction to all tags. Further, the beacon message can include payload data, such as sensor data, to be incorporated into a tag message of the identification tag receiving the beacon message. In particular, the beacon message is incorporated in a directed light signal transmitted from communication strips of the beacon device.

The beacon message is received at an identification tag, as illustrated at 1006. The tag can process the beacon message and act in response to the beacon message. For example, the beacon message can include a location identifier that the identification tag includes in a tag message transmitted by the identification tag to a reader. In another example, the beacon message can include instructions for the identification tag to initiate a visual or audio signal so that the tag can be more easily located. In a further example, the beacon message can include payload data to be incorporated into a tag message transmitted by the identification tag.

The identification tag can transmit a tag message to be received by a reader, as illustrated at 1008. For example, the reader can be a general reader receiving messages from multiple identification tags or can be a specific reader in proximity to the identification tag. In particular, the tag message is transmitted via a radio frequency signal.

Figure 11:
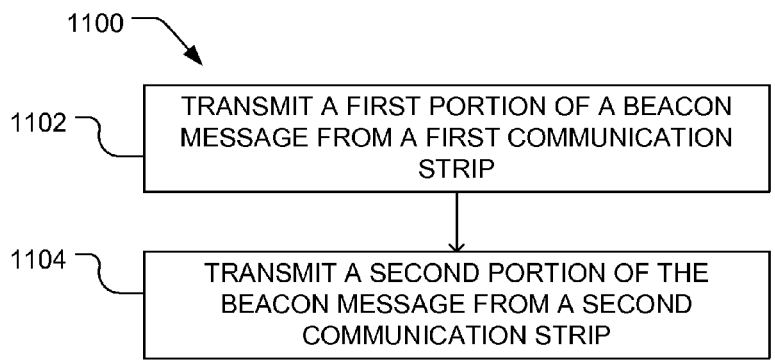

When transmitting the beacon message, the beacon device can transmit the message in more than one part via more than one communication strip. In the exemplary method 1100 illustrated in FIG. 11, the beacon device can transmit a first portion of a beacon message by a first communication strip, as illustrated at 1102, and can transmit a second portion of the beacon message via a second communication strip, as illustrated at 1104. For example, the first portion of the beacon message can include a first portion of a location identifier and the second portion can include a second portion of the identifier. The first or second portions can include error correction bits or checksums to assist a tag in determining whether a complete signal has been received. In such a manner, a tag disposed between two communication strips is likely to receive a signal from both communication strips and thus, receive the complete signal, whereas a tag disposed elsewhere can receive no portion of the beacon signal or can receive only a single portion of the beacon signal and is less likely to respond to the beacon signal.

Figure 12:
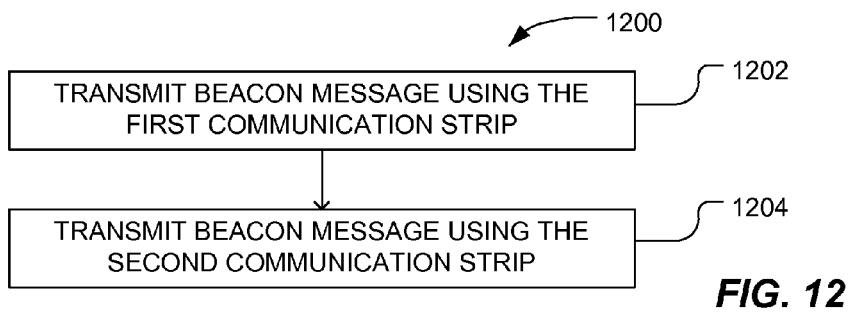

In another exemplary method 1200 illustrated in FIG. 12, the message can be transmitted twice either in unison or consecutively. For example, the message can be transmitted by a first communication strip at a first time, as illustrated at 1202, and can be transmitted by a second communication strip, such as at a second or subsequent time, as illustrated at 1204. If transmitted in unison, the signal strength of the directed light signal received by a receiver of an identification tag is likely to be stronger than ambient noise and thus, is more likely to be interpreted by the identification tag as a message and processed. Alternatively, the messages can be transmitted at subsequent times or different times and an identification tag can be programmed to wait for reception of a confirmation signal before acting on any one signal. In such a manner, identification tags disposed between communication strips transmitting the same message are more likely to receive both messages at consecutive times and thus, act on the messages, than identification tags disposed elsewhere.

Embodiments of the above-described system and components exhibit particular technical advantages over prior art systems. For example, such systems can provide more accurate equipment tracking with less manual interaction. In another example, such systems can have lower power consumption. In a further example, such systems allow for accurate asset tracking in crowded server rooms.

In a first aspect, an identification tag includes a processor, a transmitter coupled to the processor, a directed light receiver coupled to the processor, and a lens having first and second major surfaces and a side surface, the lens including an internal reflection surface to reflect a directed light signal received through the side surface to the directed light receiver.

In an example of the first aspect, the processor is to direct the transmitter to transmit a tag message based at least in part on the directed light signal. In a further example of the first aspect, the transmitter is a radio frequency transmitter. In another example of the first aspect, the directed light signal is an infrared signal.

In an additional example of the first aspect, the lens has a disc shape. For example, the disc shape can be a circular shape. In another example, the disc shape has a polygonal shape.

In another example of the first aspect, the internal reflective surface is conical. For example, the conical internal reflective surface can have a central axis aligned with the directed light receiver.

In a further example of the first aspect, the directed light receiver includes a variable gain filter.

In a particular example of the first aspect, the lens has a major surface attenuation of at least 30%, such as at least 50%. In an additional example, the lens has a side surface transmission of at least 35%, such as at least 50%.

In another example of the first aspect, the identification tag further includes a flexible substrate, the lens coupled to the flexible substrate. For example, the identification tag can further include an adhesive disposed on one surface of the flexible substrate.

In a second aspect, an identification tag includes a processor, a transmitter coupled to the processor, a directed light receiver coupled to the processor, and a lens disposed over the directed light receiver. The lens has a major surface attenuation of at least 30% and a side surface transmission of at least 35%.

In a third aspect, a beacon device includes a processor and a communication strip coupled to the processor. The communication strip has a strip aspect ratio of at least 20. The communication strip includes a plurality of directed light emitters distributed along the communication strip.

In an example of the third aspect, the processor is to facilitate transmission of a location identifier in a directed light signal via the directed light emitters. In another example of the third aspect, the directed light emitters include terminal ends of optical fibers. In an additional example of the third aspect, the beacon device further includes an infrared emitter connected to an opposite terminal end of the optical fibers.

In a further example of the third aspect, the directed light emitters include infrared emitters.

In another example of the third aspect, the communication strip extends along a vertical side of a rack. In an example, the beacon device can further include a channel guide, the communication strip disposed in the channel guide.

In an additional example of the third aspect, the processor is to facilitate transmission of a directed light signal via the directed light emitters of the communication strip. For example, the processor can facilitate transmission of a directed light noise via the directed light emitters of the communication strip, the directed light signal having greater strength than the directed light noise.

In a further example of the third aspect, the beacon device further includes a second communication strip including a plurality of directed light emitters distributed along the second communication strip. For example, the processor can facilitate transmission of a directed light signal via the directed light emitters of the second communication strip. In another example, the processor can facilitate transmission of a first portion of a directed light signal via the directed light emitters of the communication strip and a second portion of the directed light signal via the directed light emitters of the second communication strip. In another example, the beacon device further includes a communication interface.

In a fourth aspect, a system includes a beacon device including a communication strip having a plurality of directed light emitters distributed along the communication strip. The beacon device can transmit a directed light signal via the directed light emitters. The system further includes a tag including a processor, a radio frequency transmitter coupled to the processor, a directed light receiver coupled to the processor, and a lens having first and second major surfaces and a side surface, the tag to receive the directed light signal via the side surface and to transmit a radio frequency tag message via the radio frequency transmitter. The system also includes a radio frequency reader to receive the radio frequency tag message.

In a fifth aspect, a method to transmit a directed light signal includes transmitting a directed light noise via directed light emitters distributed along a communication strip and transmitting a directed light signal via the directed light emitters distributed along the communication strip. The directed light signal has greater strength than the directed light noise.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A system comprising:
   a beacon device including a processor and a communication strip coupled to the processor, the communication strip having an aspect ratio of at least 20 and having a plurality of directed light emitters distributed along the communication strip, the beacon device to transmit a directed light signal via the directed light emitters;
   a tag including:
     a tag processor;
     a transmitter coupled to the tag processor;
     a directed light receiver coupled to the tag processor; and
     a lens having first and second major surfaces and a side surface, the lens including an internal reflection surface to reflect the directed light signal received though the side surface to the directed light receiver, the tag to receive the directed light signal via the side surface and to transmit a radio frequency tag message via the transmitter; and
   a radio frequency reader to receive the radio frequency tag message.

2. The system of claim 1, wherein the tag processor is to direct the transmitter to transmit a tag message based at least in part on the directed light signal.

3. The system of claim 1, wherein the transmitter is a radio frequency transmitter.

4. The system of claim 1, wherein the directed light signal is an infrared signal.

5. The system of claim 1, wherein the lens has a disc shape.

6. The system of claim 1, wherein the internal reflective surface is conical.

7. The system of claim 6, wherein the conical internal reflective surface has a central axis aligned with the directed light receiver.

8. The system of claim 1, wherein the directed light receiver includes a variable gain filter.

9. The system of claim 1, wherein the lens has a major surface attenuation of at least 30%.

10. The system of claim 1, wherein the lens has a side surface transmission of at least 35%.

11. The system of claim 1, further comprising a flexible substrate, the lens coupled to the flexible substrate.

12. The system of claim 11, further comprising an adhesive disposed on one surface of the flexible substrate.

13. The system of claim 1, wherein the processor of the beacon device is to facilitate transmission of a location identifier in a directed light signal via the directed light emitters.

14. The system of claim 1, wherein the directed light emitters include infrared emitters.

15. The system of claim 1, wherein the communication strip extends along a vertical side of a rack.

16. The system of claim 1, wherein the processor of the beacon device is to facilitate transmission of a directed light signal via the directed light emitters of the communication strip.

17. The system of claim 16, wherein the processor of the beacon device is to facilitate transmission of a directed light noise via the directed light emitters of the communication strip, the directed light signal having greater strength than the directed light noise.

18. The system of claim 1, further comprising a second communication strip including a plurality of directed light emitters distributed along the second communication strip.

19. The system of claim 18, wherein the processor of the beacon device is to facilitate transmission of a directed light signal via the directed light emitters of the second communication strip.

20. The system of claim 18, wherein the processor of the beacon device is to facilitate transmission of a first portion of a directed light signal via the directed light emitters of the communication strip and a second portion of the directed light signal via the directed light emitters of the second communication strip.

* * * * *